United States Patent
Li et al.

(10) Patent No.: US 10,524,257 B2
(45) Date of Patent: Dec. 31, 2019

(54) TTI BUNDLING FOR URLLC UL/DL TRANSMISSIONS

(71) Applicant: QUALCOMM Incorporated, San Diego, CA (US)

(72) Inventors: Chih Ping Li, San Diego, CA (US); Chong Li, Weehawken, NJ (US); Jing Jiang, San Diego, CA (US); Wanshi Chen, San Diego, CA (US); Hao Xu, San Diego, CA (US); Haitong Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/480,019

(22) Filed: Apr. 5, 2017

(65) Prior Publication Data
US 2018/0103468 A1    Apr. 12, 2018

Related U.S. Application Data

(60) Provisional application No. 62/405,955, filed on Oct. 9, 2016.

(51) Int. Cl.
*H04W 72/04* (2009.01)
*H04L 5/00* (2006.01)
(Continued)

(52) U.S. Cl.
CPC .......... *H04W 72/0446* (2013.01); *H04B 7/14* (2013.01); *H04L 1/189* (2013.01); *H04L 1/1896* (2013.01); *H04L 5/0055* (2013.01); *H04L 5/0057* (2013.01); *H04L 25/0202* (2013.01); *H04L 27/2601* (2013.01);
(Continued)

(58) Field of Classification Search
CPC .............................. H04L 1/189; H04L 1/1896
See application file for complete search history.

(56) References Cited

U.S. PATENT DOCUMENTS 9,184,880 B2    11/2015  Vos
9,282,567 B2*   3/2016   Golitschek Edler Von
                          Elbwart .............. H04B 7/2656
(Continued)

FOREIGN PATENT DOCUMENTS

EP    2635082 A1    9/2013
EP    2947802 A1    11/2015

OTHER PUBLICATIONS

International Search Report and Written Opinion—PCT/US2017/047597—ISA/EPO—dated Nov. 6, 2017.

*Primary Examiner* — Robert C Scheibel
(74) *Attorney, Agent, or Firm* — Norton Rose Fulbright LLP

(57) ABSTRACT

Transmission time interval (TTI) bundling for ultra-reliable low-latency communication (URLLC) uplink and downlink transmissions is discussed in which a base station or user equipments (UEs) determine conditions for one or more served UEs that would indicate enabling TTI bundling for data and/or control transmissions. The serving base station transmits an enablement signal signifying that TTI bundling will be performed for data and/or control transmissions. The enablement signal may include a bundle length for the transmission bundle. The data or control signal packets may then be repeatedly transmitted to the UEs a number of times corresponding to the bundle length.

30 Claims, 8 Drawing Sheets

(51) Int. Cl.
*H04B 7/14* (2006.01)
*H04L 25/02* (2006.01)
*H04L 12/26* (2006.01)
*H04L 27/26* (2006.01)
*H04L 1/18* (2006.01)
*H04W 88/02* (2009.01)

(52) U.S. Cl.
CPC .............. *H04L 43/08* (2013.01); *H04L 43/16* (2013.01); *H04W 88/02* (2013.01)

(56) References Cited

U.S. PATENT DOCUMENTS

| | | | |
|---|---|---|---|
| 9,596,071 B1* | 3/2017 | Naim | H04L 5/1438 |
| 9,986,556 B1* | 5/2018 | Zhou | H04B 7/2656 |
| 2010/0329188 A1* | 12/2010 | Jen | H04B 7/2606 370/328 |
| 2013/0242889 A1* | 9/2013 | Khoryaev | H04W 72/0413 370/329 |
| 2013/0343273 A1 | 12/2013 | Barbieri et al. | |
| 2015/0039958 A1* | 2/2015 | Vos | H04L 1/1819 714/748 |
| 2015/0071209 A1* | 3/2015 | Chae | H04L 1/1887 370/329 |
| 2015/0180621 A1* | 6/2015 | Guan | H04B 1/713 370/330 |
| 2015/0237644 A1* | 8/2015 | Golitschek Edler Von Elbwart | H04W 72/12 370/329 |
| 2015/0341960 A1* | 11/2015 | Quan | H04L 5/0044 370/329 |
| 2016/0164643 A1* | 6/2016 | Loehr | H04L 1/1854 370/336 |
| 2016/0174224 A1* | 6/2016 | Tang | H04W 72/0446 370/336 |
| 2017/0111145 A1* | 4/2017 | Hoglund | H04L 1/1812 |
| 2017/0214495 A1* | 7/2017 | Golitschek Edler Von Elbwart | H04L 1/1671 |
| 2018/0199341 A1* | 7/2018 | Baldemair | H04W 72/0453 |

\* cited by examiner

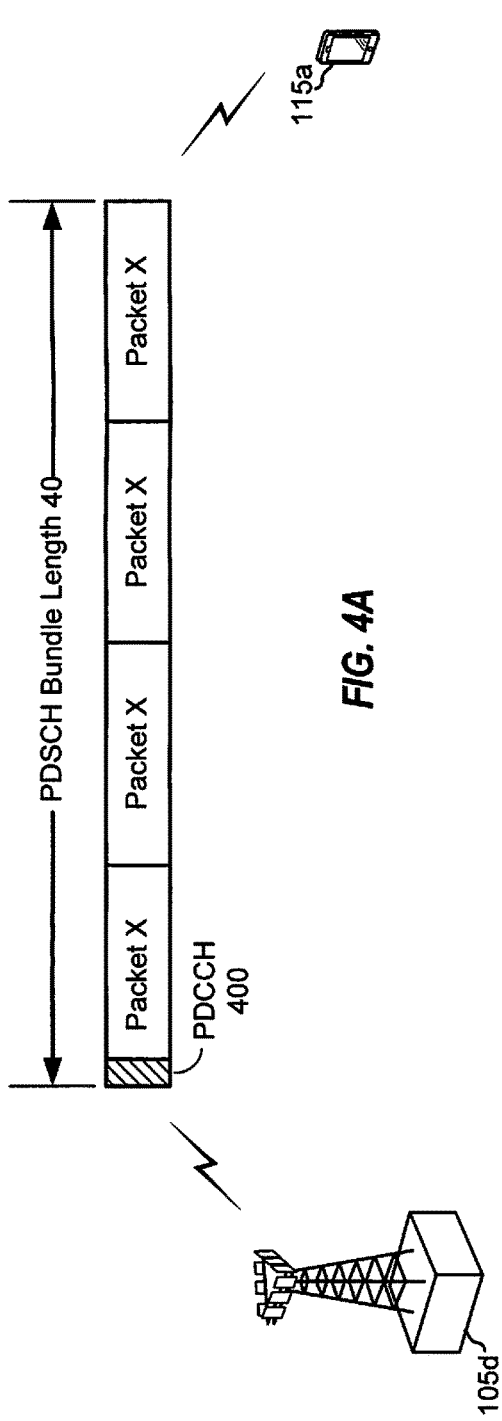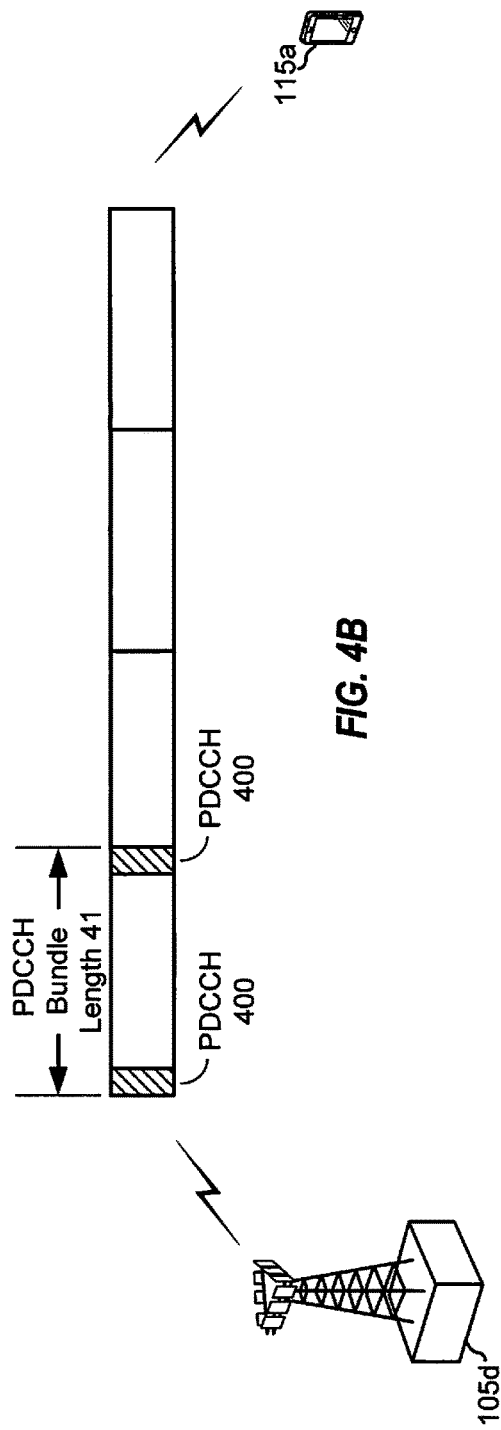

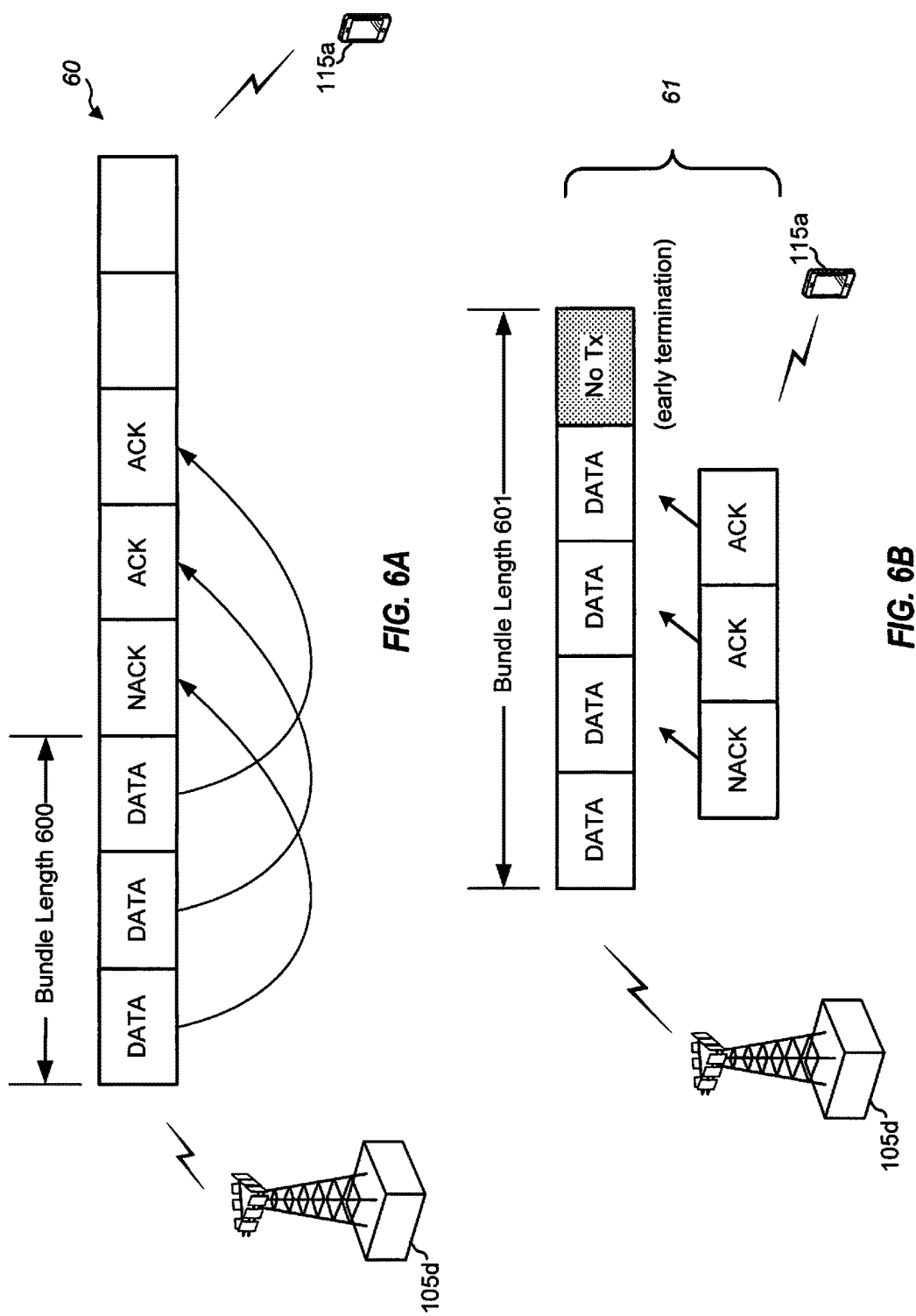

TTI BUNDLING FOR URLLC UL/DL TRANSMISSIONS

CROSS-REFERENCE TO RELATED APPLICATIONS

This application claims the benefit of U.S. Provisional Patent Application No. 62/405,955, entitled, "TTI BUNDLING FOR URLLC UL/DL TRANSMISSIONS," filed on Oct. 9, 2016, which is expressly incorporated by reference herein in its entirety.

BACKGROUND

Field

Aspects of the present disclosure relate generally to wireless communication systems, and more particularly, to transmission time interval (TTI) bundling for ultra-reliable low-latency communication (URLLC) uplink and downlink transmissions.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless ultra-reliable low-latency communication (URLLC) includes determining conditions for one or more served UEs indicating to enable transmission time interval (TTI) bundling of data transmissions, transmitting an enablement signal of TTI bundling of the data transmissions to the one or more UEs, wherein the enablement signal includes a bundle length for a data bundle of the data transmissions, and repeatedly transmitting a data packet of the data transmission to the one or more UEs, wherein a number of times the data packet is repeatedly transmitted in the data bundle corresponds to the bundle length.

In an additional aspect of the disclosure, an apparatus configured for wireless URLLC includes means for determining conditions for one or more served UEs indicating to enable TTI bundling of data transmissions, means for transmitting an enablement signal of TTI bundling of the data transmissions to the one or more UEs, wherein the enablement signal includes a bundle length for a data bundle of the data transmissions, and means for repeatedly transmitting a data packet of the data transmission to the one or more UEs, wherein a number of times the data packet is repeatedly transmitted in the data bundle corresponds to the bundle length.

In an additional aspect of the disclosure, a non-transitory computer-readable medium having program code recorded thereon. The program code further includes code to determine conditions for one or more served UEs indicating to enable TTI bundling of data transmissions, code to transmit an enablement signal of TTI bundling of the data transmissions to the one or more UEs, wherein the enablement signal includes a bundle length for a data bundle of the data transmissions, and code to repeatedly transmit a data packet of the data transmission to the one or more UEs, wherein a number of times the data packet is repeatedly transmitted in the data bundle corresponds to the bundle length.

In an additional aspect of the disclosure, an apparatus configured for wireless communication is disclosed. The apparatus includes at least one processor, and a memory coupled to the processor. The processor is configured to determine conditions for one or more served UEs indicating to enable TTI bundling of data transmissions, to transmit an enablement signal of TTI bundling of the data transmissions to the one or more UEs, wherein the enablement signal includes a bundle length for a data bundle of the data transmissions, and to repeatedly transmit a data packet of the data transmission to the one or more UEs, wherein a number of times the data packet is repeatedly transmitted in the data bundle corresponds to the bundle length.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A and 4B are block diagrams illustrating base stations and UEs, both configured according to aspects of the present disclosure.

FIGS. 6A-6C are block diagrams illustrating base stations and UEs, each configured according to aspects of the present disclosure.

DETAILED DESCRIPTION

Figure 1:
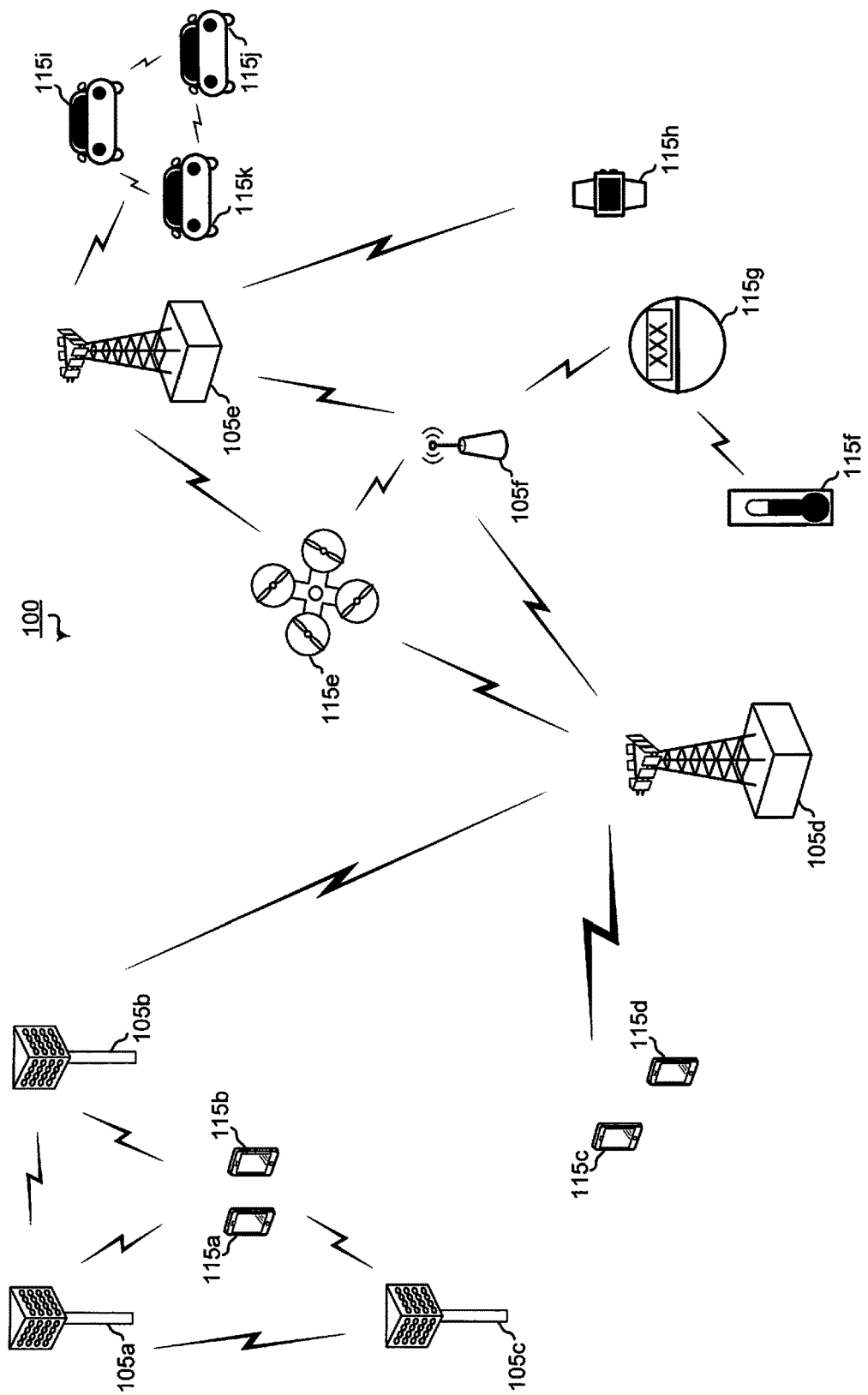
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or New Radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating NR 5G network 100 including various base stations and UEs configured according to aspects of the present disclosure. The 5G network 100 includes a number of base stations 105 and other network entities. A base station may be a station that communicates with the UEs and may also be referred to as a base station, an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (ME) devices. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations; whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
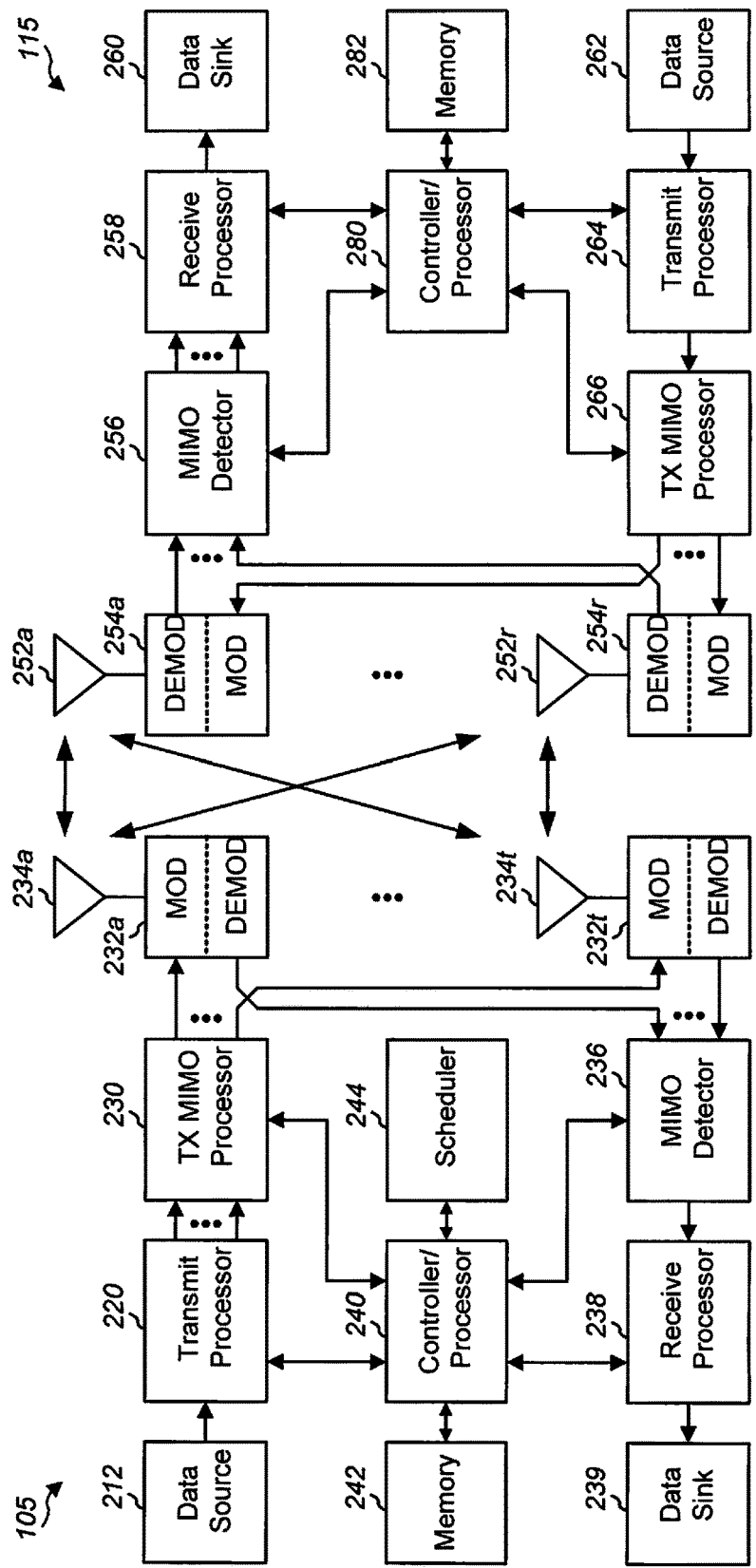
FIG. 2 is a block diagram illustrating a design of a base station and a UE configured according to one aspect of the present disclosure.

FIG. 2 shows a block diagram of a design of a base station 105 and a UE 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 3, and/or other processes for the techniques described herein. The memories 242 and 282 may store data and program codes for the base station 105 and the UE 115, respectively. A scheduler 244 may schedule UEs for data transmission on the downlink and/or uplink.

In LTE, transmission time interval (TTI) bundling is used for uplink transmissions of voice over internet protocol (VOIP) traffic to improve coverage for power-limited UEs. However, acknowledgments (ACK/NACK) are only received for the last TTI of the bundle. In such existing TTI bundling scenarios, the bundling is semi-static as VOIP traffic is mostly periodic and does not incur delay because of queueing at the transmitter side.

Ultra-reliable low-latency communication (URLLC) services involve high system reliability (e.g., 1e−5) and low latency (e.g., 1 ms). Latency here refers to the time between a packet arriving at the media access control (MAC) buffer at the transmitter side and being decoded at the receiver side. That is, latency includes scheduling delay, queueing delay, transmission delay, base station/UE processing delay, multiple HARQ turnarounds, and decoding delay. For URLLC, the latency requirement is a hard deadline, such that the packet will be of no use and dropped when the deadline is missed. Therefore, a missed deadline means that the packet cannot be successfully decoded by the deadline. System reliability is determined based on a proportion of packet losses over time.

In 3GPP LTE systems, the standard latency/reliability requirements are 1 ms for downlink or uplink with 1e−5 reliability for X bytes of data (e.g., X=20). Each URLLC packet may be given enough physical resources across HARQ transmissions to yield residual block error rate (BLER) less than the system reliability before the deadline. A lower BLER can be achieved by using a low-rate channel code, which occupies more physical resource blocks.

Cell-edge UEs may often use many HARQ transmissions to meet the stringent residual BLER (e.g., 1e−5) on the downlink. HARQ transmission opportunities may be limited because of (1) the stringent delay restricts the number of allowed HARQ round trip times (RTTs); (2) bursty packet arrivals which generally create a queueing effect that reduces the usable delay budget for HARQ transmission; and (3) retransmissions for other UEs' data block new transmissions of cell-edge UEs. Various aspects of the present disclosure are directed to applying TTI bundling to URLLC transmissions in both uplink and downlink directions.

Figure 3:
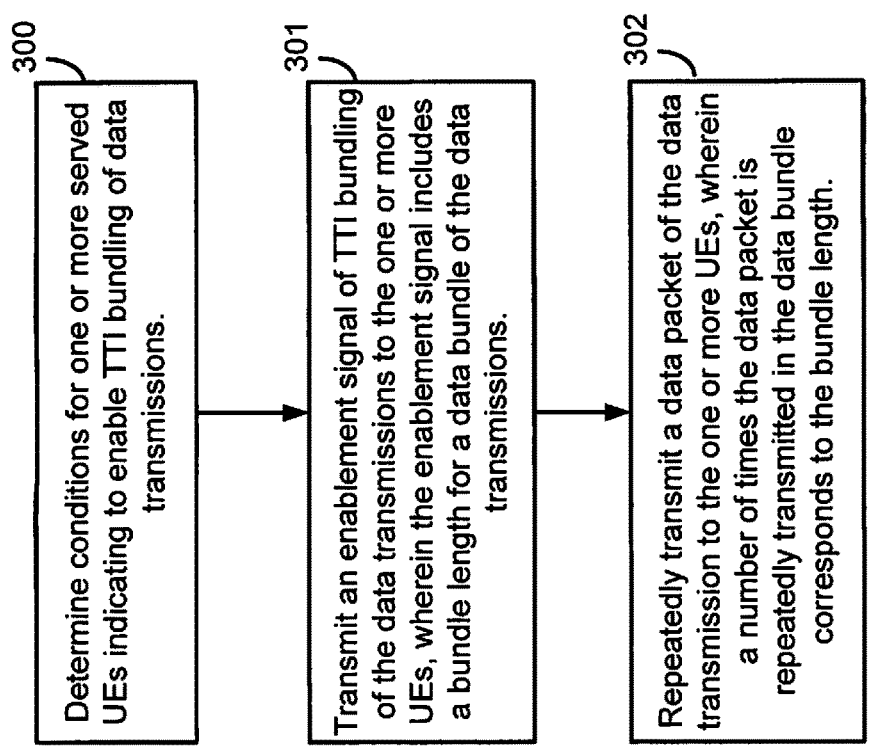
FIG. 3 is a block diagram illustrating example blocks executed to implement one aspect of the present disclosure.
Figure 7:
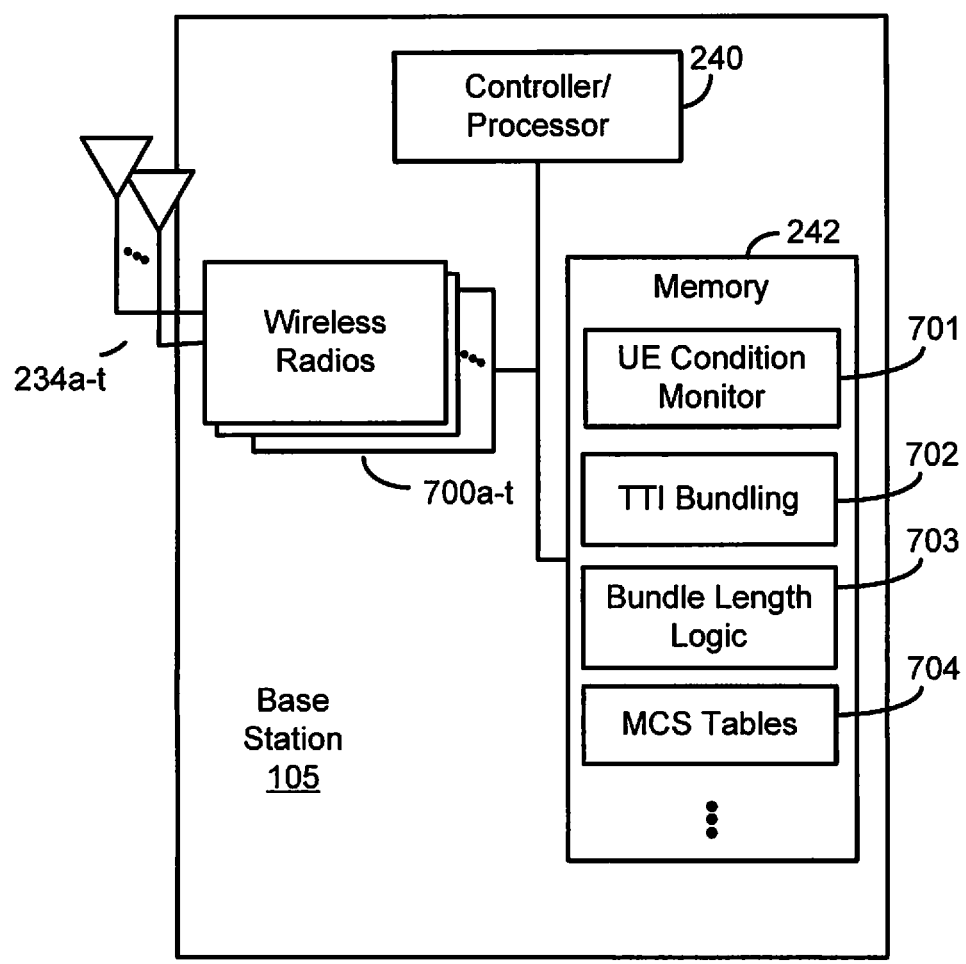
FIG. 7 is a block diagram illustrating a base station configured according to one aspect of the present disclosure.

FIG. 3 is a block diagram illustrating example blocks executed to implement one aspect of the present disclosure. The example blocks will also be described with respect to base station 105 as illustrated in FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t includes various components and hardware, as illustrated in FIG. 2 for base station 105, including modulator/demodulators 232a-t, MIMO detector 236, receive processor 238, transmit processor 220, and TX MIMO processor 230.

At block 300, conditions are determined for one or more served UEs to enable TTI bundling of data transmissions. For example, TTI bundling may be semi-statically or dynamically updated. In one aspect, TTI bundling may be tied to a certain modulation and coding scheme (MCS). In another aspect, TTI bundling may be triggered based on, e.g., the delay budget.

For example, base station 105, under control of controller/processor 280, executes UE condition monitor 701, stored in memory 242. The execution environment of UE condition monitor 701 monitors the MCS of the UEs, the delay budget, and other conditions and parameters, such as latency requirement, delay deadline, and the like, that may be weighed when determining whether a UE may benefit from TTI bundling. If the remaining delay budget of a packet allows at most one HARQ RTT, TTI bundling may be applied to the initial HARQ transmission. Otherwise, TTI bundling may be applied only to HARQ retransmissions to improve system efficiency. Such conditions may be determined directly by a base station serving the UEs, or may be determined by the UEs, in which the UEs request TTI bundling. Where a UE sends a request for TTI bundling, base station 105 uses the execution environment of UE condition monitor 701 to identify the UEs available for TTI bundling.

At block 301, the base station transmits an enablement signal of the TTI bundling of the data transmissions to the one or more UEs, wherein the enablement signal includes a bundle length for a data bundle of the data transmissions. For example, base station 105, under control of controller/processor 240, executes TTI bundling logic 702. The execution environment of TTI bundling logic 702 allows for base station 105 to bundle the data transmissions. PDSCH/PUSCH TTI bundling may be signaled with an enablement signal via PDCCH. Moreover, the downlink control information (DCI) may specify the length of the bundle, and whether or not frequency hopping will be applied. These signals are transmitted by base station 105 via wireless radios 700a-t and antennas 234a-t, under control of controller/processor 240.

At block 302, the base station repeatedly transmits a data packet of the data transmission to the one or more UEs, wherein a number of times the data packet is repeated transmitted in the data bundle corresponds to the bundle length. With TTI bundling enabled for the data, each data packet is repeatedly transmitted over the bundle length by execution of TTI bundling logic 702. Because the receiving UEs will keep the received packets for any packets that are not properly decoded, each subsequent copy of the packet will be used along with the previous packet(s) for combined decoding. Thus, with each subsequent decoding attempt, the probability of properly decoding the data packet increases.

FIG. 4A is a block diagram illustrating a base station 105d and UE 115a, both configured according to aspects of the present disclosure. With TTI bundling enabled, a data bundling length 40 is determined based on the various conditions, including MCS, remaining delay budget, CQI measurements, and the like. For example, base station 105, under control of controller/processor 240, executes bundle length logic 703, stored in memory 242, to determine the bundle length based on the various conditions and target parameters. The same packet, packet X, is transmitted repeatedly over the bundle for data bundle length 40. The enabling of the TTI bundling may also be signaled to UE 115a from base station 105d using PDCCH 400. UE 115a will receive and decode PDCCH 400 with the enablement indicator that not only indicates that TTI bundling is enabled, but also identifies, such as through the DCI, data bundle length 40. Therefore, as base station 105d begins repeatedly transmitting packet X, UE 115a will expect that the same packet, packet X, will be transmitted for data bundling length 40.

FIG. 4B is a block diagram illustrating base station 105d and UE 115a, both configured according to aspects of the present disclosure. In addition to applying TTI bundling to data transmissions via PDSCH, it may also be applied to control signaling via PDCCH. TTI bundling of PDCCH improves reliability of the downlink grant. For example, in transmitting control signals, via PDCCH 400, base station 105d may enable TTI bundling. In setting control bundle length 41, base station 105d may consider many of the same conditions or parameters as setting of data bundle length 40. However, control bundle length 41 for PDCCH 400 may be different than data bundle length 40 for PDSCH to UE 115a. In order to avoid false alarms, an additional bit field may be provided in PDCCH 400 to indicate the presence of a PDCCH TTI bundle to UE 115a.

Figure 5:
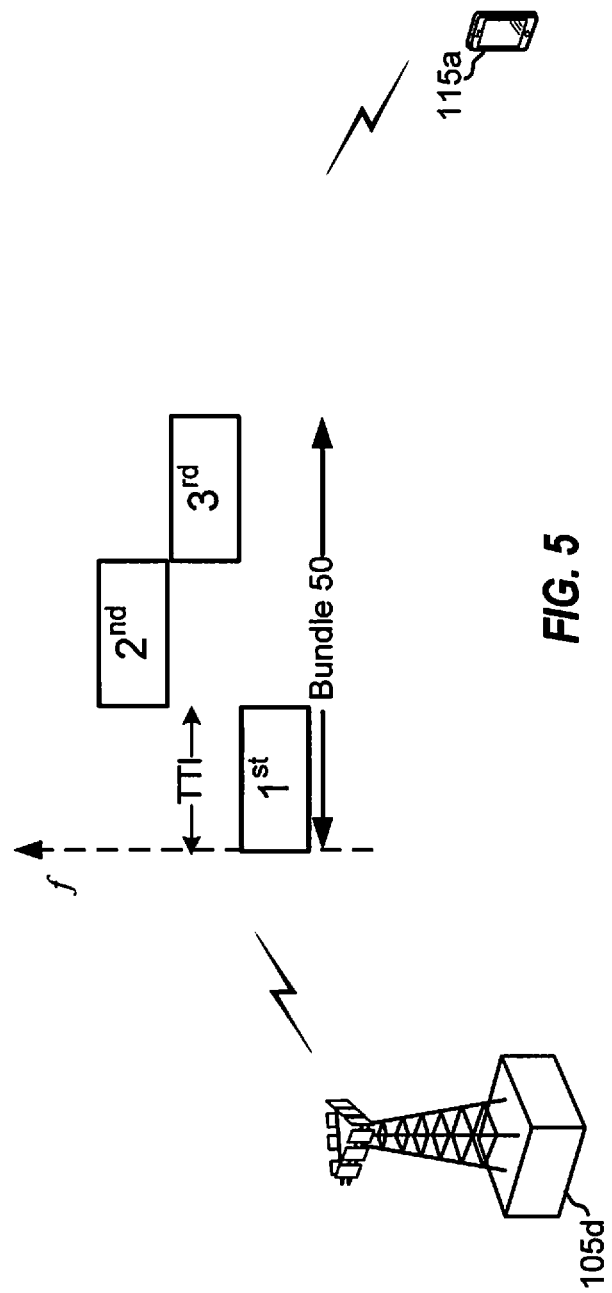
FIG. 5 is a block diagram illustrating a base station and UE, both configured according to aspects of the present disclosure.

FIG. 5 is a block diagram illustrating base station 105d and UE 115a, both configured according to aspects of the present disclosure. Frequency hopping may be performed across transmissions in either PDCCH or PDSCH bundles. For example, in transmitting data packets in a TTI bundle 50, base station 105d may transmit a first TTI at a first frequency, and second and third TTIs of TTI bundle 50 at different frequencies according to a frequency hopping pattern. Similarly, when transmitting PDCCH according to TTI bundling, the control channels transmitted according to TTI bundle 50 may also be transmitted according to a frequency hopping pattern.

It should be noted that, in various aspects of the present disclosure, transmissions in the same bundle, for example TTI bundle 50, may or may not use the same number of resources. The aspects described herein are not limited to a set amount of resources per transmitted TTI.

FIG. 6A is a block diagram illustrating base station 105d and UE 115a, each configured according to aspects of the present disclosure. Each transmission in a bundle may be separately decodable. Joint encoding may assist when dealing with small packet size. However, providing for separately decodable packets may be beneficial for the timeline. For example, as base station 105d separately encodes the data packets in bundle length 600 transmitted over communication stream 60, UE 115a may separately decode each packet and provide an acknowledgement for each packet.

Currently, LTE use of TTI bundling for uplink transmissions may provide for collectively acknowledging transmissions after completion of the bundle. Thus, the UE, such as UE 115a, would only receive an acknowledgement (whether ACK or NACK) after transmitting all of the uplink packets in the bundle. However, according to the aspects of the present disclosure, back-to-back transmission of ACK/NACK may help to reduce unnecessary retransmissions and improve the tail behavior of blocking.

As illustrated in FIG. 6A, after initially reporting a NACK for failure to decode the first transmitted downlink instance of the data packet, UE 115a would report back-to-back ACK signals after successfully decoding the second and third transmissions of the data packet over communication stream 60. The back-to-back ACK/NACK transmissions may also provide a more robust acknowledgement than by sending a single ACK/NACK for only the last transmission of the bundle.

FIG. 6B is a block diagram illustrating base station 105*d* and UE 115*a*, each configured according to aspects of the present disclosure. A network node operating under TTI bundling and waiting for acknowledgements of its transmitted bundles may elect to stop transmitting the remaining packets in the bundle after receiving the first N ACKs, where N=1, 2, . . . , etc. As illustrated, communication stream 61 is a frequency division duplex (FDD) communication stream. Base station 105*d* may elect to stop transmitting (early termination) the rest of the bundle of bundle length 601 after receiving the two consecutive ACKs identifying successful decoding of the second two transmission instances of the data packet by UE 115*a*. Thus, in the last transmission instance before the end of bundle length 601, base station 105*d* may elect not to continue transmitting the data packet, in order to improve system efficiency.

The bundle size, such as bundle length 600 and 601, are also configurable, in which the bundle size may be selected to achieve a target residual BLER. The bundle size selection is determined by base station 105 (FIG. 7) by execution, under control of controller/processor 240, of bundle length logic 702. The execution environment of bundle length logic 702 provides base station 105 the functionality for determining bundle length, which may depend on various conditions, such as the accuracy of channel estimation and CQI measurement/reporting, a target delay budget, reliability target, etc. Thus, when setting bundle lengths 600 and 601, base station 105*d*, through the execution environment of bundle length logic 703, may consider both the conditions and the target parameters for URLLC. After determining the bundle size that will achieve the target residual BLER considering those conditions and parameters, base station 105*d* would signal bundle lengths 600 and 601, to UE 115*a*, respectively (FIGS. 6A & 6B).

Additional aspect may provide preconfigured or semi-statically configured tables that allow a UE to select an appropriate MCS based on the TTI bundle length identified. Thus, for example, when base station 105*d* sets bundle length 600, as described above, an indicator for bundle length 600 is received by UE 115*a*. UE 115*a* may then select an MCS for its transmissions by accessing a predefined table to select the MCS indexed or corresponding to the given TTI bundle size. The table may be indexed based on the TTI bundle length. Thus, using the table, UE 115 may select the MCS corresponding to the given TTI bundle length. The predefined table may be set and stored at UE 115*a* by the device manufacturer, or it may be semi-statically communicated to UE 115*a* by the network through various serving base stations, such as base station 105*d* and MCS tables 704, stored in memory 242.

Proposed criteria for URLLC services include the availability of scalable numerologies. Accordingly, in one aspect, a base station, such as base station 105*d* (FIG. 6A) may signal the exact tone-spacing and slot duration to served UEs, such as UE 115*a*, and decide bundle length 600 based on the selected numerology.

In another aspect, UE 115*a* may be able to select the numerology that best fits its conditions. UE 115*a* would then signal the selected numerology to base station 105*d*, which would then determine bundle length 600 according to the selected numerology. The signaling of such scalable numerologies may be connected to the uplink and downlink grants and may be transmitted by either base station 105*d* or UE 115*a* depending on which entity is selecting the numerology.

Additional aspects of the present disclosure may provide for UEs to request a serving base station to enable TTI bundling for URLLC. In such aspects, the UE, such as UE 115*a* (FIG. 6A) may determine that TTI bundling would be beneficial for downlink data and/or control signaling based on the conditions and target parameters that UE 115*a* should meet. UE 115*a* may then transmit such a request for TTI bundling to base station 105*d* using a scheduling request (SR). In one example implementation, the request may be a 2-bit uplink SR, in which the first bit may indicate the SR, while the second bit indicates a request to enable/disable the TTI bundling (e.g., a TTI bundling enablement identifier). Base station 105*d* would receive the SR that includes the TTI bundling enablement identifier and begin handling TTI bundling for downlink communications to UE 115*a* in response thereto.

Figure 6C:
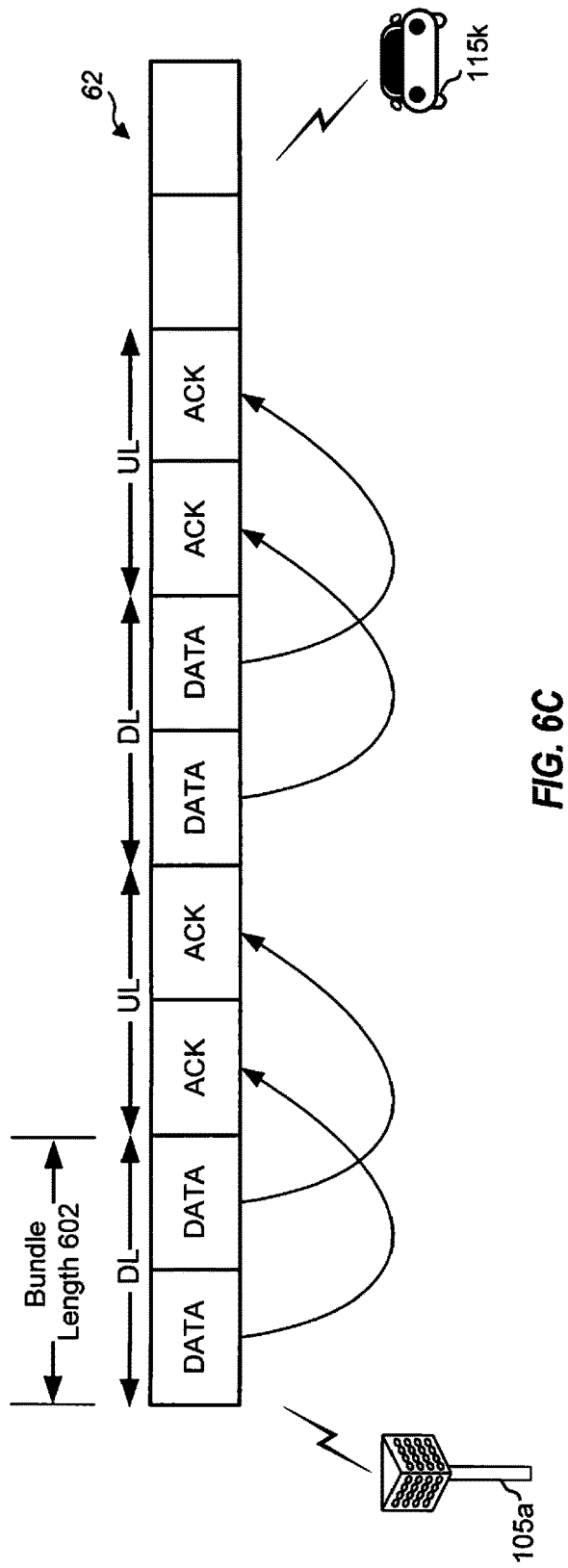

FIG. 6C is a block diagram illustrating base station 105*a* and UE 115*k*, each configured according to aspects of the present disclosure. Various aspects may further provide for URLLC services that have different reliability and latency requirements, for which different TTI bundle lengths are needed. The different requirements may be specific to the particular service the URLLC is intended for (e.g., vehicle-to-vehicle (V2V) transmissions, self-driving cars, remote piloting communication to drones, and the like). Base station 105*a* would signal the service-specific TTI bundle length to the served UEs, such as UE 115*k*, which is a self-driving vehicle. Bundle length 602 may be set by base station 105*a* in order to maximize the reliability or latency requirements for self-driving vehicles. If a different UE operating a different service were to begin communications with base station 105*a*, base station 105*a* may assign a different set of TTI bundling parameters that are associated with the particular service that the UE was operating.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 3 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless ultra-reliable low-latency communication (URLLC), comprising:
   determining conditions for one or more user equipments (UEs) indicating to enable transmission time interval (TTI) bundling of data transmissions;
   determining a desired target block error rate (BLER) of the one or more UEs;
   determining, based on the determined conditions for the one or more UEs, a bundle length, for a data bundle of the data transmissions, that corresponds to the desired BLER, wherein the determining the bundle length that corresponds to the desired BLER includes determining that the bundle length results in the desired target BLER of the one or more UEs under the determined conditions for the one or more UEs;
   transmitting an enablement signal of TTI bundling of the data transmissions to the one or more UEs, wherein the enablement signal includes the bundle length for a data bundle of the data transmissions;
   repeatedly transmitting a data packet of the data transmission to the one or more UEs, wherein a number of times the data packet is repeatedly transmitted in the data bundle corresponds to the bundle length;
   receiving an acknowledgement signal from the one or more UEs for the repeatedly transmitted data packet, wherein the acknowledgement signal is one of: a positive acknowledgement (ACK) or a negative acknowledgement (NACK); and
   ending the repeatedly transmitting the data packet of the data bundle prior to the bundle length in response to receiving a first threshold number of consecutive ACKs for the data packet from the one or more UEs.

2. The method of claim 1, wherein the determining the conditions includes one of:
   determining one or more of a modulation and coding scheme (MCS) of the one or more UEs, and a remaining delay budget of the data packet;
   receiving a scheduling request from the one or more UEs, wherein the scheduling request includes a request for TTI bundling; or
   determining a deadline associated with a latency requirement of the data packet.

3. The method of claim 2, further including one of:
   applying the repeatedly transmitting to transmissions of the data transmissions when the remaining delay budget of the data packet is below a threshold delay time; and applying the repeatedly transmitting to retransmissions of the data transmissions when the remaining delay budget meets or exceeds the threshold delay time.

4. The method of claim 1, wherein the determining the bundle length is based on one or more of:
a channel estimate associated with the one or more UEs;
channel quality indicator (CQI) measurements received from the one or more UEs;
a modulation and coding scheme (MCS) of the one or more UEs;
a target reliability; and
a delay budget associated with the data packet.

5. The method of claim 1, wherein the determining the conditions includes:
determining a category of service with the one or more UEs, wherein the category of service is associated with a set of TTI bundling configurations, wherein the set of TTI bundling configurations includes one or more of:
service-specific reliability target;
service-specific latency target; and
TTI bundling size; and
transmitting to the one or more UEs a table of modulation and coding schemes (MCS) indexed according to the TTI bundling size.

6. The method of claim 1, further including:
determining to scale a numerology for communications with the one or more UEs;
transmitting tone spacing and slot duration to the one or more UEs, wherein the one or more UEs selects a TTI bundling size based on the tone spacing and slot duration of the numerology.

7. The method of claim 1, further including:
repeatedly transmitting a control channel to the one or more UEs, wherein the control channel includes another enablement signal indicating TTI bundling of the control channel, and wherein a number of times the control channel is repeatedly transmitted corresponds to a control bundle of a second bundle length.

8. The method of claim 7, wherein the repeatedly transmitting the data packet and the repeatedly transmitting the control channel are transmitted according to a frequency hopping pattern across the data bundle and the control bundle, respectively.

9. The method of claim 7, further including:
separately encoding each data packet repeatedly transmitted over the data bundle; and
separately encoding each control channel repeatedly transmitted over the control bundle.

10. The method of claim 7, further including:
receiving an acknowledgement signal from the one or more UEs for the repeatedly transmitted control channel; and
ending the repeatedly transmitting the control channel of the control bundle prior to the second bundle length in response to receiving a second threshold number of consecutive ACKs for the control channel from the one or more UEs.

11. An apparatus configured for wireless communication, comprising:
means for determining conditions for one or more user equipments (UEs) indicating to enable transmission time interval (TTI) bundling of data transmissions;
means for determining a desired target block error rate (BLER) of the one or more UEs;
means for determining, based on the determined conditions for the one or more UEs, a bundle length, for a data bundle of the data transmissions that corresponds to the desired BLER, wherein the means for determining the bundle length that corresponds to the desired BLER includes means for determining that the bundle length results in the desired target BLER of the one or more UEs under the determined conditions for the one or more UEs;
means for transmitting an enablement signal of TTI bundling of the data transmissions to the one or more UEs, wherein the enablement signal includes the bundle length for a data bundle of the data transmissions; and
means for repeatedly transmitting a data packet of the data transmission to the one or more UEs, wherein a number of times the data packet is repeatedly transmitted in the data bundle corresponds to the bundle length;
means for receiving an acknowledgement signal from the one or more UEs for the repeatedly transmitted data packet, wherein the acknowledgement signal is one of: a positive acknowledgement (ACK) or a negative acknowledgement (NACK); and
means for ending the repeated transmissions the data packet of the data bundle prior to the bundle length in response to receiving a first threshold number of consecutive ACKs for the data packet from the one or more UEs.

12. The apparatus of claim 11, wherein the means for determining the bundle length is based on one or more of:
a channel estimate associated with the one or more UEs;
channel quality indicator (CQI) measurements received from the one or more UEs;
a modulation and coding scheme (MCS) of the one or more UEs;
a target reliability; and
a delay budget associated with the data packet.

13. The apparatus of claim 11, wherein the means for determining the conditions includes:
means for determining a category of service with the one or more UEs, wherein the category of service is associated with a set of TTI bundling configurations, wherein the set of TTI bundling configurations includes one or more of:
service-specific reliability target;
service-specific latency target; and
TTI bundling size; and
means for transmitting to the one or more UEs a table of modulation and coding schemes (MCS) indexed according to the TTI bundling size.

14. The apparatus of claim 11, further including:
means for determining to scale a numerology for communications with the one or more UEs;
means for transmitting tone spacing and slot duration to the one or more UEs, wherein the one or more UEs selects a TTI bundling size based on the tone spacing and slot duration of the numerology.

15. The apparatus of claim 11, further including:
means for repeatedly transmitting a control channel to the one or more UEs, wherein the control channel includes another enablement signal indicating TTI bundling of the control channel, and wherein a number of times the control channel is repeatedly transmitted corresponds to a control bundle of a second bundle length.

16. A non-transitory computer-readable medium having program code recorded thereon, the program code comprising:
program code executable by a computer for causing the computer to determine conditions for one or more user equipments (UEs) indicating to enable transmission time interval (TTI) bundling of data transmissions;

program code executable by the computer for causing the computer to determine a desired target block error rate (BLER) of the one or more UEs;

program code executable by the computer for causing the computer to determine, based on the determined conditions for the one or more UEs, a bundle length, for a data bundle of the data transmissions that corresponds to the desired BLER, wherein the program code executable by the computer for causing the computer to determine the bundle length that corresponds to the desired BLER includes program code executable by the computer for causing the computer to determine that the bundle length results in the desired target BLER of the one or more UEs under the determined conditions for the one or more UEs;

program code executable by the computer for causing the computer to transmit an enablement signal of TTI bundling of the data transmissions to the one or more UEs, wherein the enablement signal includes the bundle length for a data bundle of the data transmissions; and program code executable by the computer for causing the computer to repeatedly transmit a data packet of the data transmission to the one or more UEs, wherein a number of times the data packet is repeatedly transmitted in the data bundle corresponds to the bundle length;

program code executable by the computer for causing the computer to receive an acknowledgement signal from the one or more UEs for the repeatedly transmitted data packet, wherein the acknowledgement signal is one of: a positive acknowledgement (ACK) or a negative acknowledgement (NACK); and program code executable by the computer for causing the computer to end the repeated transmissions the data packet of the data bundle prior to the bundle length in response to receiving a first threshold number of consecutive ACKs for the data packet from the one or more UEs.

17. The non-transitory computer-readable medium of claim 16, wherein the program code executable by the computer for causing the computer to determine the bundle length is based on one or more of:
a channel estimate associated with the one or more UEs;
channel quality indicator (CQI) measurements received from the one or more UEs;
a modulation and coding scheme (MCS) of the one or more UEs;
a target reliability; and
a delay budget associated with the data packet.

18. The non-transitory computer-readable medium of claim 16, wherein the program code executable by the computer for causing the computer to determine the conditions includes:
program code executable by the computer for causing the computer to determine a category of service with the one or more UEs, wherein the category of service is associated with a set of TTI bundling configurations, wherein the set of TTI bundling configurations includes one or more of:
service-specific reliability target;
service-specific latency target; and
TTI bundling size; and
program code executable by the computer for causing the computer to transmit to the one or more UEs a table of modulation and coding schemes (MCS) indexed according to the TTI bundling size.

19. The non-transitory computer-readable medium of claim 16, further including:
program code executable by the computer for causing the computer to determine to scale a numerology for communications with the one or more UEs;
program code executable by the computer for causing the computer to transmit tone spacing and slot duration to the one or more UEs, wherein the one or more UEs selects a TTI bundling size based on the tone spacing and slot duration of the numerology.

20. The non-transitory computer-readable medium of claim 16, further including:
program code executable by the computer for causing the computer to repeatedly transmit a control channel to the one or more UEs, wherein the control channel includes another enablement signal indicating TTI bundling of the control channel, and wherein a number of times the control channel is repeatedly transmitted corresponds to a control bundle of a second bundle length.

21. An apparatus configured for wireless communication, the apparatus comprising:
at least one processor; and
a memory coupled to the at least one processor,
wherein the at least one processor is configured:
to determine conditions for one or more user equipments (UEs) indicating to enable transmission time interval (TTI) bundling of data transmissions;
to determine a desired target block error rate (BLER) of the one or more UEs;
to determine, based on the determined conditions for the one or more UEs, a bundle length, for a data bundle of the data transmissions, that corresponds to the desired BLER, wherein the configuration of the at least one processor to determine the bundle length that corresponds to the desired BLER includes configuration of the at least one processor to determine that the bundle length results in the desired target BLER of the one or more UEs under the determined conditions for the one or more UEs;
to transmit an enablement signal of TTI bundling of the data transmissions to the one or more UEs, wherein the enablement signal includes the bundle length for a data bundle of the data transmissions; and
to repeatedly transmit a data packet of the data transmission to the one or more UEs, wherein a number of times the data packet is repeatedly transmitted in the data bundle corresponds to the bundle length;
to receive an acknowledgement signal from the one or more UEs for the repeatedly transmitted data packet, wherein the acknowledgement signal is one of: a positive acknowledgement (ACK) or a negative acknowledgement (NACK);
to end the repeatedly transmissions of the data packet of the data bundle prior to the bundle length in response to receiving a first threshold number of consecutive ACKs for the data packet from the one or more UEs.

22. The apparatus of claim 21, wherein the configuration of the at least one processor to determine the conditions includes configuration of the at least one processor to one of:
determine one or more of a modulation and coding scheme (MCS) of the one or more UEs, and a remaining delay budget of the data packet; or receive a scheduling request from the one or more UEs, wherein the scheduling request includes a request for TTI bundling.

23. The apparatus of claim 22, further including configuration of the at least one processor to one of:
apply the configuration of the at least one processor to repeatedly transmit to transmissions of the data transmissions when the remaining delay budget of the data packet is below a threshold delay time; and
apply the configuration of the at least one processor to repeatedly transmit to retransmissions of the data transmissions when the remaining delay budget meets or exceeds the threshold delay time.

24. The apparatus of claim 21, wherein the configuration of the at least one processor to determine the bundle length is based on one or more of:
a channel estimate associated with the one or more UEs;
channel quality indicator (CQI) measurements received from the one or more UEs;
a modulation and coding scheme (MCS) of the one or more UEs;
a target reliability; and
a delay budget associated with the data packet and the control channel, respectively.

25. The apparatus of claim 21, wherein the configuration of the at least one processor to determine the conditions includes configuration of the at least one processor:
to determine a category of service with the one or more UEs, wherein the category of service is associated with a set of TTI bundling configurations, wherein the set of TTI bundling configurations includes one or more of:
service-specific reliability target;
service-specific latency target; and
TTI bundling size; and
to transmit to the one or more UEs a table of modulation and coding schemes (MCS) indexed according to the TTI bundling size.

26. The apparatus of claim 21, further including configuration of the at least one processor:
to determine to scale a numerology for communications with the one or more UEs;
to transmit tone spacing and slot duration to the one or more UEs, wherein the one or more UEs selects a TTI bundling size based on the tone spacing and slot duration of the numerology.

27. The apparatus of claim 21, further including configuration of the at least one processor to repeatedly transmit a control channel to the one or more UEs, wherein the control channel includes another enablement signal indicating TTI bundling of the control channel, and wherein a number of times the control channel is repeatedly transmitted corresponds to a control bundle of a second bundle length.

28. The apparatus of claim 27, wherein the configuration of the at least one processor to repeatedly transmit the data packet and the configuration of the at least one processor to repeatedly transmit the control channel are transmitted according to a frequency hopping pattern across the data bundle and the control bundle, respectively.

29. The apparatus of claim 27, further including configuration of the at least one processor:
to separately encode each data packet repeatedly transmitted over the data bundle; and
to separately encode each control channel repeatedly transmitted over the control bundle.

30. The apparatus of claim 27, further including configuration of the at least one processor:
to receive an acknowledgement signal from the one or more UEs for the repeatedly transmitted control channel;
and
to end the configuration of the at least one processor to repeatedly transmit the control channel of the control bundle prior to the second bundle length in response to receiving a second threshold number of consecutive ACKs for the control channel from the one or more UEs.

* * * * *